UNITED STATES PATENT OFFICE.

CONRAD SEMPER, OF PHILADELPHIA, PENNSYLVANIA, ASSIGNOR TO HARRISON BROTHERS & CO., OF SAME PLACE.

MANUFACTURE OF SIZING COMPOUNDS FOR PAPER-MAKERS' USE.

SPECIFICATION forming part of Letters Patent No. 333,680, dated January 5, 1886.

Application filed July 22, 1885. Serial No. 172,291. (No specimens.)

*To all whom it may concern:*

Be it known that I, CONRAD SEMPER, of the city and county of Philadelphia and State of Pennsylvania, have invented a new and useful Improvement in the Manufacture of Sizing Compounds for Paper-Makers' Use, of which the following is a specification.

The object of my invention is to produce direct from bauxite, or any other ferruginous raw material, a sizing compound for the use of paper-makers, free or nearly free from iron, and consisting, chiefly, of sulphate of alumina and sulphate of zinc and water, or of sulphate of alumina and sulphate of magnesia and water, or a mixture of these substances, and in a porous or cellular condition.

The following is a convenient method of practicing my invention: Any ordinary ferruginous aluminous material—such as alum, clay, or bauxite—is powdered or comminuted, and, if necessary, roasted. A proper quantity of this material is then mixed with sulphuric acid in a suitable vessel. A violent action will in most cases soon ensue. If necessary, water or weak liquor from previous operations is from time to time added to prevent overflow. When the action has ceased, the mass is further diluted with water or weak liquor, so that it will not harden when cold.
A sample is now taken, filtered, and tested to determine whether the solution is neutral or basic. If it still shows an excess of sulphuric acid, a sufficient quantity of hydrate of alumina, oxide of zinc, or carbonate of magnesia is added until the proper point of basisity is reached. After the liquor has been neutralized, if such neutralization was necessary, it is separated from its insoluble admixtures, which can be accomplished by subsidence, filtration, or by any other means. The liquor, which consists, chiefly, of sulphate of alumina and sulphate of iron, with other sulphates of such materials as may have been used to neutralize the solution, is now subjected to a treatment, with either plumbic dioxide, peroxide, sesquioxide, or hyperoxides of manganese, or stannic acid, or any other substance which will remove iron from aluminous solutions. In case iron should be present as a protoxide, it will be advantageous to oxidize this lower oxide into the higher or peroxide by means of any well-known oxidizing agent—such as chlorine or nitric acid—as the iron can only be removed in the form of peroxide. Should the iron be present as protoxide, it will be oxidized into peroxide at the expense of some of the above compounds. After all or nearly all the iron has been removed the liquor is separated from the insoluble matter by subsidence, filtration, or in any convenient way. It is now, if it has not already been done, treated with a sufficient quantity of oxide of zinc, or carbonate of zinc, or oxide of magnesium, or carbonate or bicarbonate of magnesia, until a sample taken fails to act destructively upon artificial ultramarine-blue. This treatment can take place at any desirable temperature; but I prefer to heat the liquors to expedite the process. When the desired point of basisity has been reached, the liquor is run into proper vessels for evaporation. If the liquor should not be entirely clear, owing to slight impurities present in the neutraliizng materials employed, it is well to clarify it, which can be accomplished by any well-known means. The clear solution is now boiled or concentrated until it reaches a density of from 60° to 65° Baumé, (more or less.) It is now left to cool, and when in a semi-fluid or pasty state a small quantity of bicarbonate of soda—say about two pounds to one thousand pounds of finished material—is rapidly stirred into the mass. The action of the hot solution on the bicarbonate of soda is to drive off carbonic-acid gas, which will render the mass porous or cellular. At this stage of the process the mass is emptied or removed into proper receptacles to harden. It is now broken up into fragments of the desired size, and is thus brought into a merchantable condition.

Letters Patent No. 257,567 have been granted to Constantine Fahlberg and myself for a process of removing iron from aluminous solutions by plumbic dioxide.

Letters Patent Nos. 264,773 and 264,774 have been granted to me for a process of removing iron from aluminous solutions by means of dioxide or sesquioxide of manganese, or by a manganate or a permanganate.

I am aware that Letters Patent No. 82,747 have been granted to Henry Pemberton for an improvement in the manufacture of porous alum.

I am also aware that Letters Patent No. 223,442 have been granted to Robert A. Fisher for a neutral compound consisting of sulphate of alumina and zinc, produced by treating a solution of sulphate of alumina with oxide of zinc.

Letters Patent No. 280,089 have been granted to me for a process of treating hot acid solutions of sulphate of alumina with magnesic carbonate, bicarbonate, or oxide.

My present invention provides a process of manufacturing direct from a ferruginous aluminous material a marketable porous compound for paper-makers' use, free or nearly free from iron, and of such basisity that it will not act harmfully on the pigments used in paper-making—such, for example, as artificial ultramarine-blue.

I do not confine myself to the use of bicarbonate of soda, as any material or agent may be employed which will produce a porous structure.

Having thus described my invention, what I claim as new, and desire to secure by Letters Patent, is—

The process of producing directly from any ferruginous aluminous material a porous neutral or basic compound for paper-makers' use, free or nearly free from iron, said process consisting, essentially, in adding to a neutral ferruginous solution of sulphate of alumina, obtained in any usual manner, plumbic dioxide or other substance which will precipitate iron in a solution of sulphate of alumina, and in removing from said solution insoluble impurities by filtration or by other suitable means, and in making said solution, either before or after its treatment with plumbic dioxide, by the addition thereto of oxide of zinc or its equivalent, sufficiently basic to fail to act upon ultramarine-blue, and in then adding bicarbonate of soda to said solution when in a sufficiently cool and concentrated condition, and in allowing the same to harden to form a porous mass, as specified.

In testimony whereof I have hereunto signed my name this 17th day of July, A. D. 1885.

CONRAD SEMPER.

In presence of—
  WM. C. STRAWBRIDGE,
  J. BONSALL TAYLOR.